United States Patent
Ozaki

(10) Patent No.: US 7,059,148 B2
(45) Date of Patent: Jun. 13, 2006

(54) AIR CHILLER UNIT

(75) Inventor: Masaji Ozaki, Tokyo (JP)

(73) Assignee: Jamco Corporation, Tokyo (JP)

( * ) Notice: Subject to any disclaimer, the term of this patent is extended or adjusted under 35 U.S.C. 154(b) by 10 days.

(21) Appl. No.: 10/996,093

(22) Filed: Nov. 24, 2004

(65) Prior Publication Data

US 2005/0115265 A1    Jun. 2, 2005

(30) Foreign Application Priority Data

Dec. 1, 2003    (JP) .............................. 2003-401779

(51) Int. Cl.
*F25B 47/00* (2006.01)

(52) U.S. Cl. ...................................................... 62/298
(58) Field of Classification Search .................. 62/298

See application file for complete search history.

(56) References Cited

U.S. PATENT DOCUMENTS

| 4,045,267 A | * | 8/1977 | Davis et al. ................. 156/197 |
| 4,437,320 A | * | 3/1984 | Eklund ......................... 62/236 |
| 5,491,979 A | | 2/1996 | Kull et al. |

* cited by examiner

*Primary Examiner*—Melvin Jones
(74) *Attorney, Agent, or Firm*—Westerman, Hattori, Daniels & Adrian, LLP.

(57) ABSTRACT

The invention provides an air chiller unit mounted on an aircraft for sending cooled air to a service cart etc. for serving meals. The air chiller unit 1 comprises a refrigeration cycle unit equipped on a casing 10. The refrigeration cycle unit is equipped with a refrigerant compressor 20, a condenser 30 and an evaporator 40, and the cooled air is sent to a galley etc. via a blower device 60. The casing 10 is formed of a honeycomb panel. Since the honeycomb panel has high flexural rigidity, the base plate can reliably support the refrigeration cycle unit by itself. Further, since the honeycomb panel has good heat insulating property, the efficiency to cool air is improved.

2 Claims, 6 Drawing Sheets

AIR CHILLER UNIT

The present application is based on and claims priority of Japanese patent application No. 2003-401779 filed on Dec. 1, 2003, the entire contents of which are hereby incorporated by reference.

FIELD OF THE INVENTION

The present invention relates to an air chiller unit (air cooling device) equipped within a body of an aircraft, for supplying cooled air to foods and the like.

DESCRIPTION OF THE RELATED ART

Passenger aircrafts that travel long distances, such as international flights, are equipped with service carts storing meals etc. to be served to passengers, and galleys (kitchen areas) storing the service carts for preparing beverages and doing easy food preparation.

The meals are cooked in advance in service facilities on the ground, placed on trays which are then stored in service carts and brought on board.

Of the meals placed on the trays, warm dishes are heated by a heater etc., and cold dishes such as salads are maintained at low temperature by feeding cooled air into the service carts.

The following patent document discloses an example of a device for cooling service carts.

Patent Document 1: U.S. Pat. No. 5,491,979

An air chiller unit is disposed in a space provided to the ceiling or under the floor of a galley in the aircraft. The air chiller unit is equipped with a refrigeration cycle unit, wherein an evaporator disposed within a cooling air chamber cools the air and supplies the cooled air via a duct to the galley or the like.

Since the air chiller unit is mounted on an aircraft, the size and weight thereof are required to be minimized, and since the unit is disposed near the passenger seats, it is necessary to reduce the noise being generated.

SUMMARY OF THE INVENTION

The object of the present invention is to provide an air chiller unit that satisfies the above-mentioned requirements.

According to the present invention, the air chiller unit mounted on an aircraft for supplying cooled air to a storage portion for storing food and the like comprises a base plate which constitutes a bottom surface of a casing for storing a refrigeration cycle unit and which is formed of a honeycomb panel composed of two panels sandwiching a honeycomb core. Furthermore, it comprises an air cooling chamber housing an evaporator of the refrigeration cycle unit for cooling air which is defined by a honeycomb panel.

As described, the present air chiller unit forms the base plate for mounting the refrigeration cycle unit by a honeycomb panel, so the base plate is capable of reliably supporting equipments such as compressors etc. that constitute the refrigeration cycle unit. Since the honeycomb panel is highly rigid, the base plate is capable of supporting the refrigeration cycle unit by itself without relying on the strength of the whole casing.

Furthermore, since the air cooling chamber housing the evaporator is formed using honeycomb panels having high heat insulating property, the present air cooling chamber achieves an advantageous heat insulating effect.

The honeycomb panel is light weight, has high flexural rigidity and good heat insulating property, so it is an ideal material to be adopted as the constructional member for forming the casing of an air chiller unit to be mounted on an aircraft.

BRIEF DESCRIPTION OF THE DRAWINGS

FIG. 5(*b*) is a sectional view showing the structure of a partition member according to the present invention;

FIG. 5(*c*) is a sectional view showing a honeycomb core structure according to the present invention.

DETAILED DESCRIPTION OF THE PREFERRED EMBODIMENT

Figure 1:
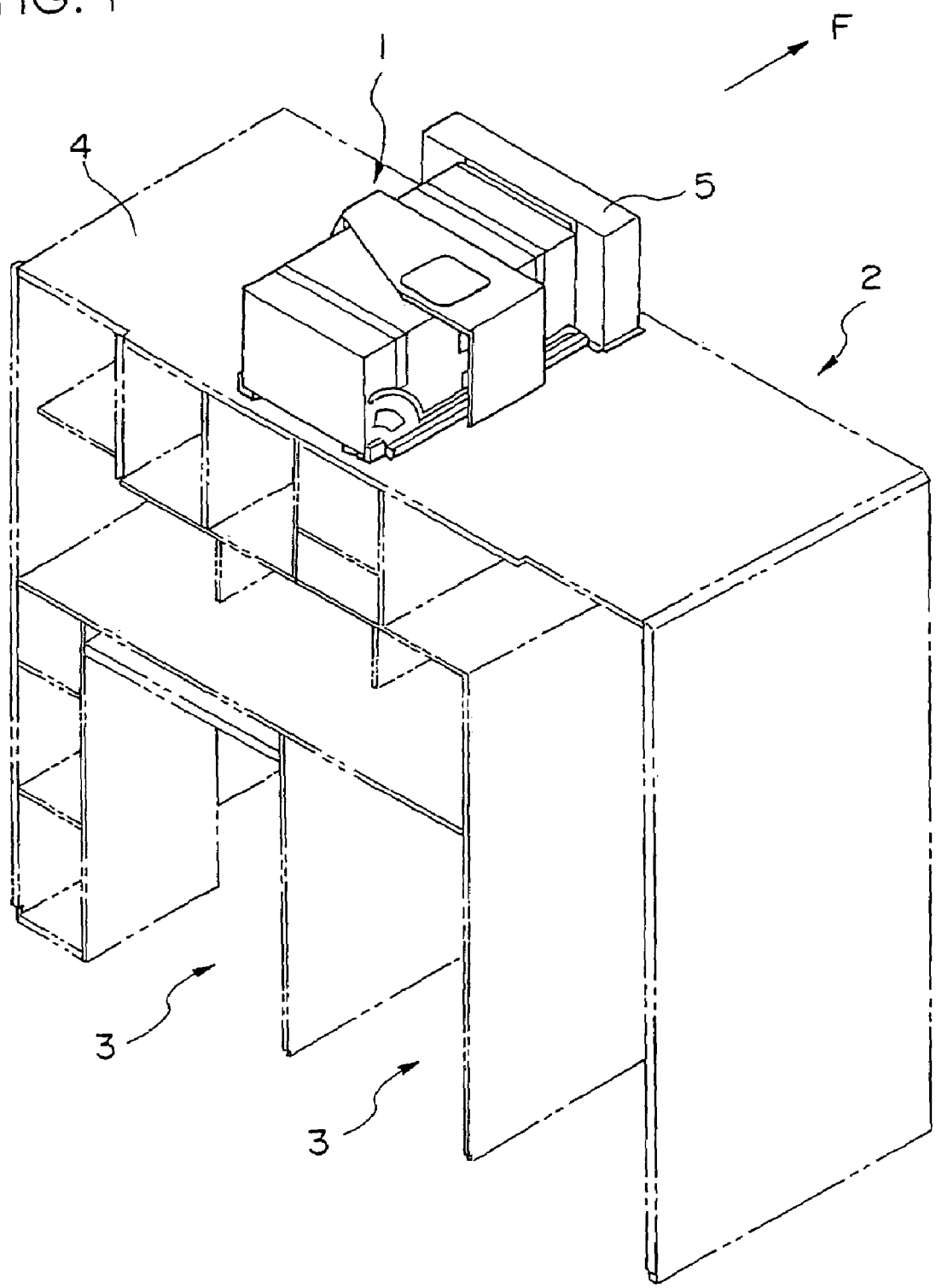
FIG. 1 is an explanatory view showing the general structure of the galley.

FIG. 1 is an explanatory view showing the outline of a galley equipped with an air chiller unit according to the present invention.

The galley, the whole of which being denoted by reference number 2, is formed of panel material and equipped with multiple shelves and storages for storing cooking devices and the like.

Storage spaces 3 provided on the floor of the galley 2 are for storing service carts (not shown) storing trays for meals.

Above a ceiling 4 of the galley 2 is attached an air chiller unit 1. The air chiller unit 1 is not exposed to the cabin, and is disposed in the ceiling of the aircraft.

Arrow F of FIG. 1 shows the front direction of the aircraft body, and a passage for cooled air for cooling the service carts is formed on the back side of the galley 2 positioned at the forward direction of the aircraft body.

The cool air circulated within the galley is recycled to the air chiller unit 1, where it is cooled to predetermined temperature and sent out toward the galley again.

A duct device 5 connected to the air chiller unit 1 is equipped with a cool air passage returning from the interior of the galley and a passage for sending freshly cooled air toward the galley.

Figure 2:
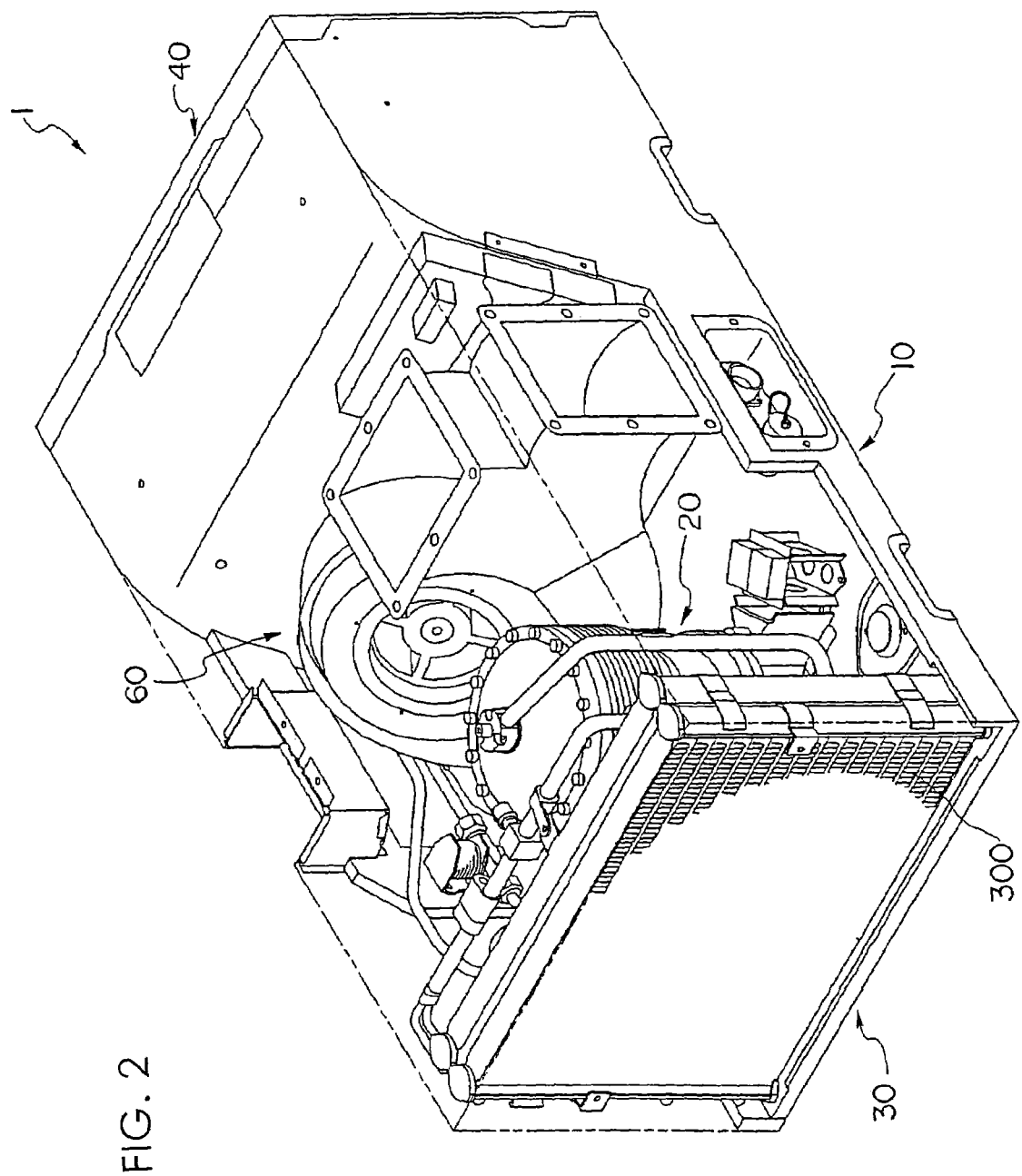
FIG. 2 is an explanatory view of an air chiller unit according to the present invention.
Figure 3:
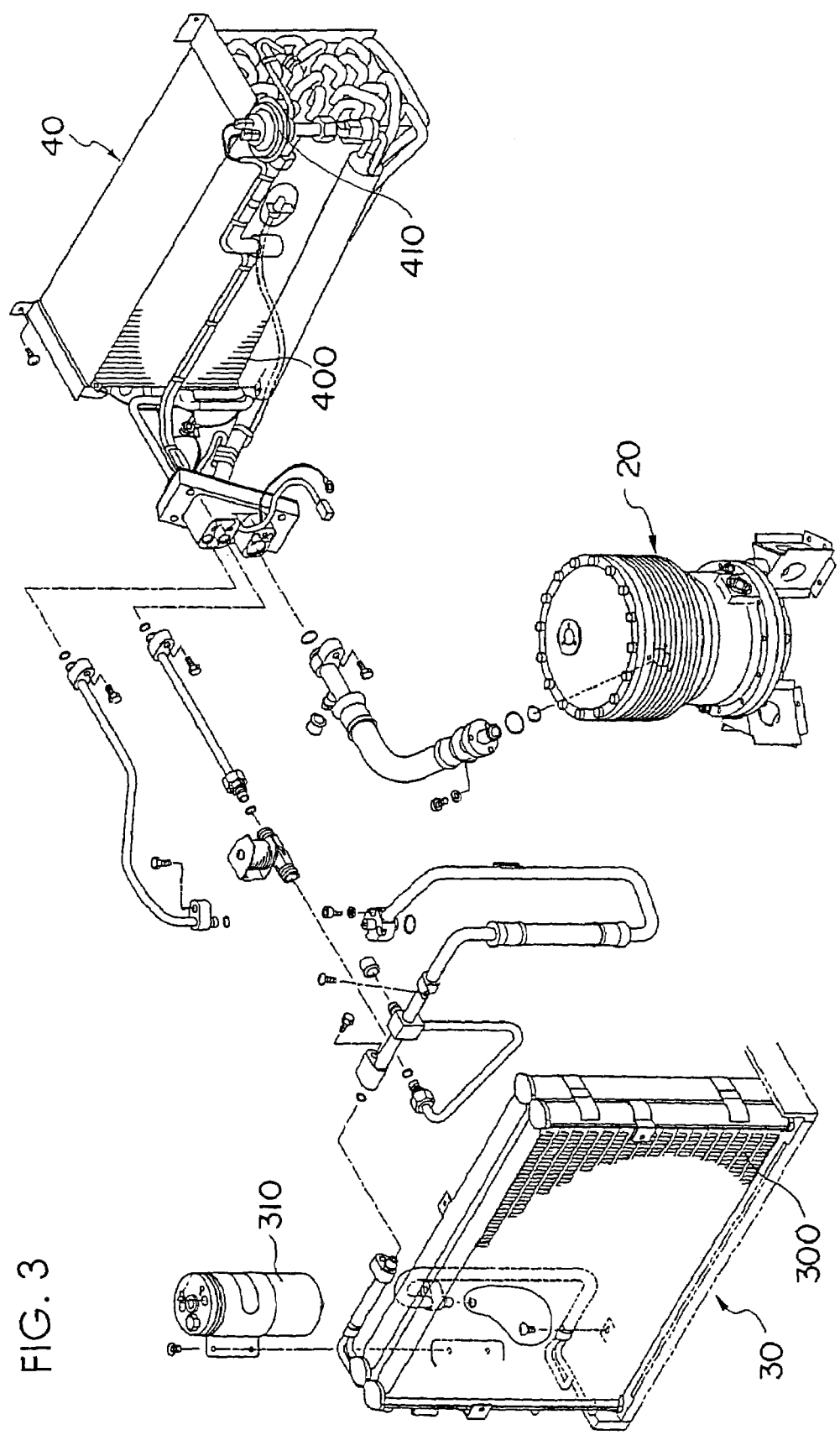
FIG. 3 is an explanatory view of a refrigeration cycle unit of the air chiller unit according to the present invention.

FIGS. 2 and 3 are explanatory views showing the exterior of the air chiller unit according to the present invention and the outline of the refrigeration cycle unit.

An air chiller unit referred to as a whole by reference number 1 is equipped with a casing 10, a compressor 20 for a refrigerant disposed within the casing 10, a condenser 30, an evaporator 40 and a blower device 60 for blowing air.

As illustrated in FIG. 3, the refrigeration cycle unit of the air chiller unit is equipped with a compressor 20 driven by a motor, for compressing the refrigerant and sending out the same toward the condenser 30. The condenser 30 is equipped with a heat exchanger 300 for exchanging the gaseous refrigerant to a liquid-phase refrigerant. The liquid-phase refrigerant is stored in a receiver drier 310 disposed adjacent to the heat exchanger. The liquid-phase refrigerant in the receiver drier 310 is sent via a piping to an evaporator 40 disposed within the air cooling chamber defined by the wall of the casing 10. The liquid-phase refrigerant travels through an expansion valve 410 equipped to the evaporator 40 and sent to a heat exchanger 400 of the evaporator. The refrigerant is then evaporated in the heat exchanger 400 and cools the air passing through the heat exchanger 400.

The expansion valve 410 changes the opening of the valve according to the pressure and temperature of the refrigerant returning toward the compressor 20 from the evaporator 40, to thereby control the flow rate of the refrigerant being sent to the evaporator.

The blower device 60 has two fans mounted on both ends of a shaft of a motor, and blows air toward the condenser 30 and also blows the cooled air generated in the air cooling chamber toward the service carts placed in the galley of the passenger cabin.

Figure 4:
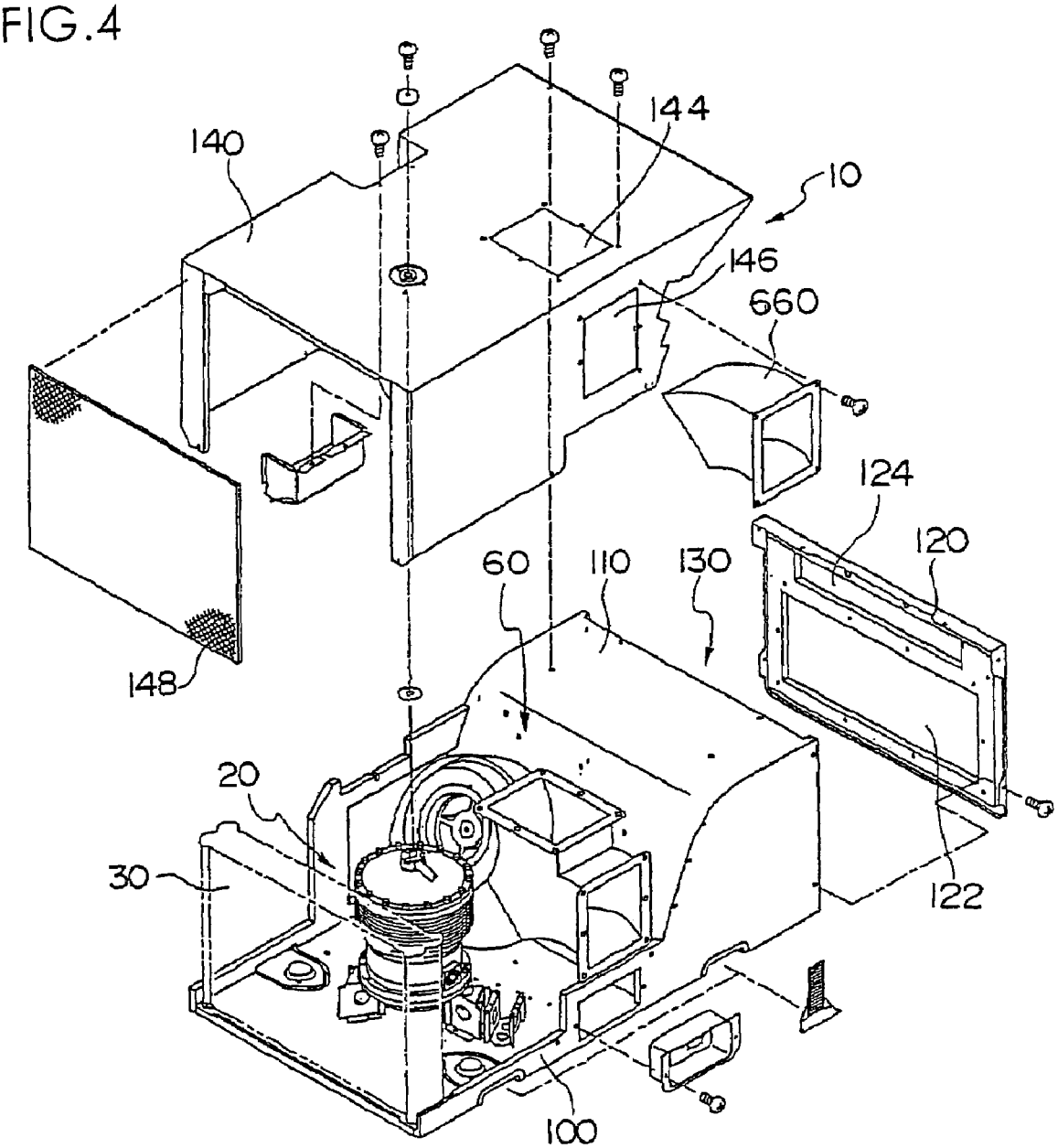
FIG. 4 is an explanatory view showing the structure of a casing of the air chiller unit according to the present invention.
Figure 5A:
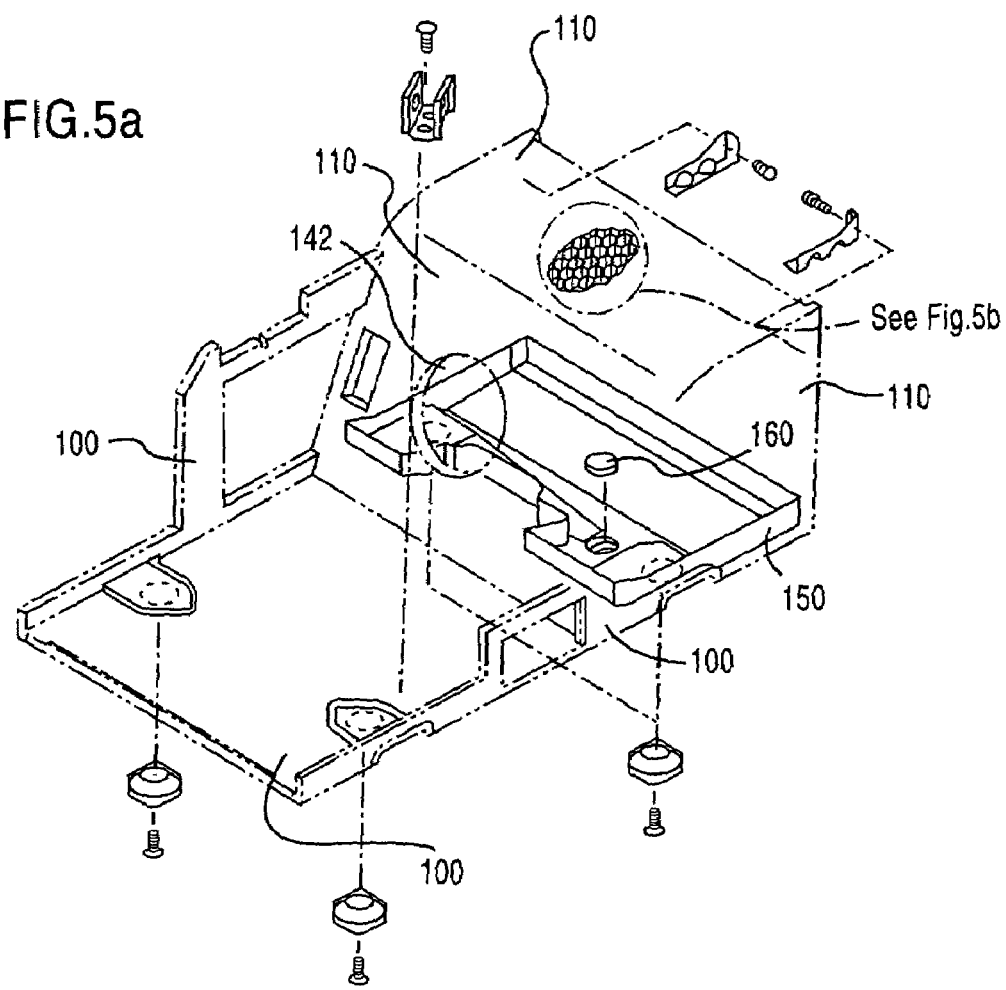
FIG. 5(*a*) is an explanatory view showing the structure of a casing of the air chiller unit according to the present invention.
Figure 5B:
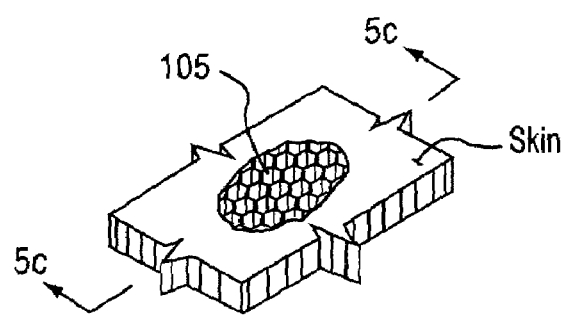
Figure 5C:
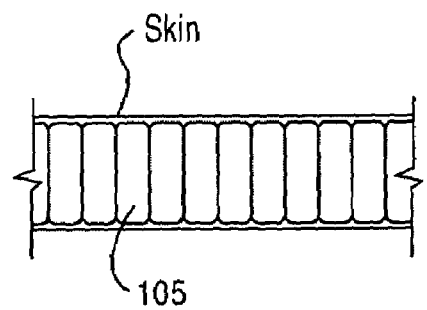

FIGS. 4 and 5 are explanatory views showing the structure of a casing of the air chiller unit according to the present invention.

The casing 10 comprises a base plate 100, and on the base plate 100 are mounted devices such as the compressor 20.

The base plate 100 is formed of a honeycomb panel manufactured by sandwiching a core member having a honeycomb structure (i.e. honeycomb core 105) between two parallel plate members.

The honeycomb panel is light weight and has superior flexural rigidity, so the base plate 100 is capable of sufficiently supporting devices such as the compressor 20 by itself.

Since the honeycomb panel is structured to have air sealed in the honeycomb core 105 it has high heat insulating property. Therefore, it is suitable for forming the air cooling chamber or the like.

A partition member 110 formed of a honeycomb panel is disposed on the base plate 100. This partition member 110 is for dividing the air chiller unit into a side having the condenser and a side having the evaporator, and on this partition member 110 is mounted the blower device 60.

The partition member constitutes a portion of the air cooling chamber 130. A lid member 120 is mounted on the opening of the partition member 110.

The lid member 120 connected to a duct device 5 is equipped with a first opening 122 and a second opening 124. The first opening 122 is connected to a passage for sending the cool air returning from the galley to the air cooling chamber 130, and the second opening 124 is connected to a passage for sending the freshly cooled air cooled in the air cooling chamber 130 toward the galley.

A cover member 140 is attached on top of the base plate 100, by which the compressor 20 and the blower device 60 are covered. The cover member 140 has rectangular openings 144 and 146 on the upper surface and side surface thereof. The openings 144 and 146 are used as exhaust outlets of air having cooled the condenser 30 and the compressor 20.

A mesh member 148 is attached to the end of the cover member 140, by which the front face of the condenser 30 is covered.

As illustrated in FIG. 5, a round hole 142 for the blower device is formed to the partition member 110. Further, a drain pan 150 for receiving water drops condensed on the evaporator is attached to the bottom of the air cooling chamber. The drain pan 150 is equipped with a drain valve 160.

Figure 6:
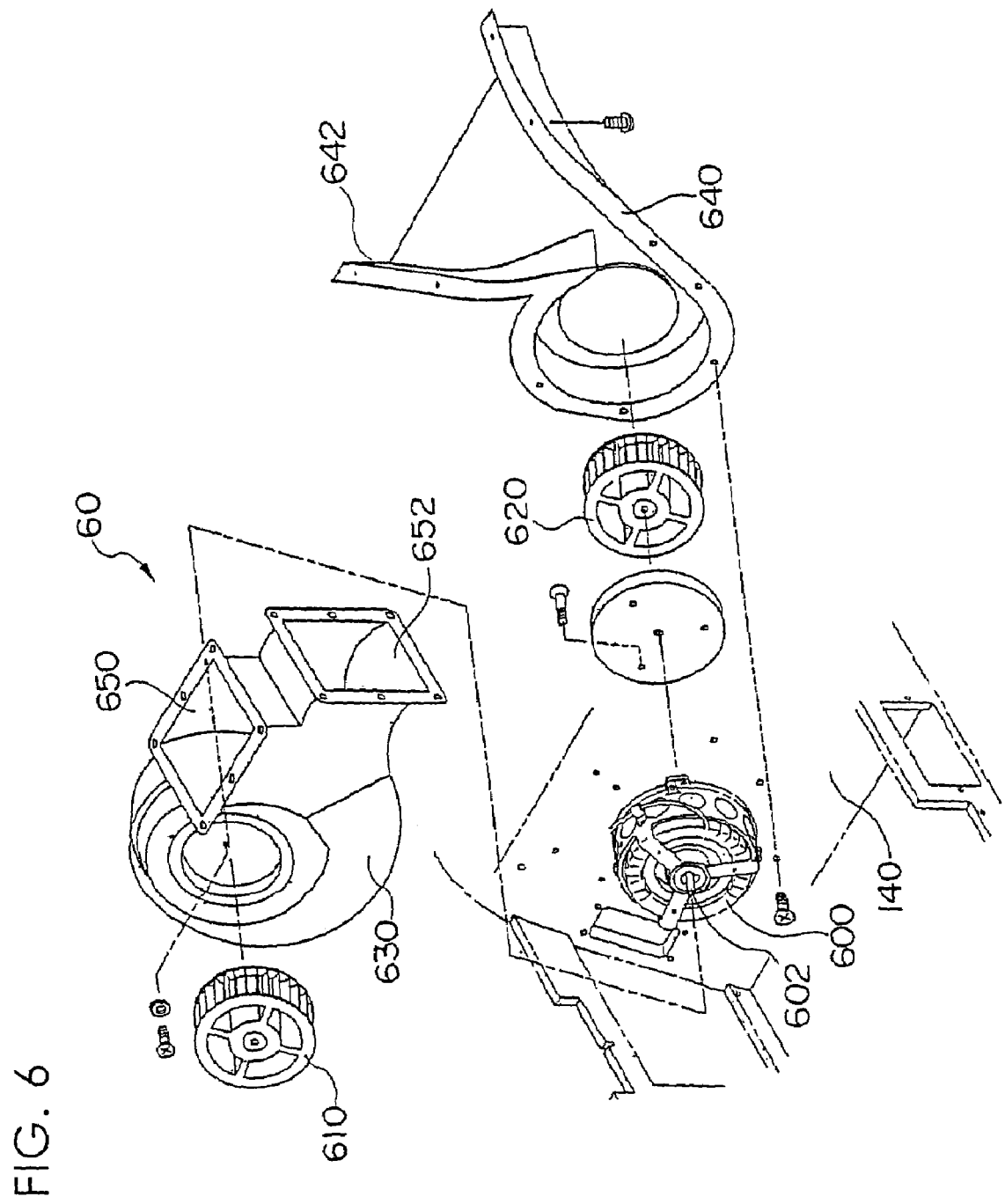
FIG. 6 is an explanatory view of a blower device of the air chiller unit according to the present invention.

FIG. 6 is an explanatory view showing the structure of the blower device 60.

The blower device 60 has a housing 630 constituting a passage for sending out cooled air, and a motor 600 disposed within the housing 630. The motor 600 has a drive shaft 602 whose both ends protrude therefrom, and on both ends of the driving shaft are fixed a first fan 610 and a second fan 620.

The first fan 610 is for blowing the air for cooling the side with the condenser 30. The second fan 620 is for blowing the air cooled in the air cooling chamber toward the galley.

An opening portion 642 of the cover 640 is connected to the second opening 124 of the lid member 120 for sending the freshly cooled air toward the galley.

What is claimed is:

1. An air chiller unit mounted on an aircraft for supplying cooled air to a storage portion for storing food and the like, the air chiller unit comprising:
   a base plate constituting a bottom surface of a casing for storing a refrigeration cycle unit formed of a honeycomb panel composed of two panels sandwiching a honeycomb core.

2. The air chiller unit according to claim 1, wherein an air cooling chamber housing an evaporator of the refrigeration cycle unit for cooling air is defined by a honeycomb panel.

* * * * *